US010481296B2

(12) United States Patent
Zacharko et al.

(10) Patent No.: US 10,481,296 B2
(45) Date of Patent: Nov. 19, 2019

(54) MAGNETIC SENSOR CORRECTION FOR FIELD GENERATED FROM NEARBY CURRENT

(71) Applicant: Halliburton Energy Services, Inc., Houston, TX (US)

(72) Inventors: Jonathan Peter Zacharko, Spring, TX (US); Robert Scott Fulford, Spring, TX (US)

(73) Assignee: Hallibunon Energy Services, Inc., Houston, TX (US)

( * ) Notice: Subject to any disclaimer, the term of this patent is extended or adjusted under 35 U.S.C. 154(b) by 725 days.

(21) Appl. No.: 14/777,899

(22) PCT Filed: Oct. 22, 2014

(86) PCT No.: PCT/US2014/061763
§ 371 (c)(1),
(2) Date: Sep. 17, 2015

(87) PCT Pub. No.: WO2016/064383
PCT Pub. Date: Apr. 28, 2016

(65) Prior Publication Data
US 2016/0299252 A1 Oct. 13, 2016

(51) Int. Cl.
G01V 13/00 (2006.01)
G01V 3/26 (2006.01)
(Continued)

(52) U.S. Cl.
CPC ............. G01V 13/00 (2013.01); E21B 7/04 (2013.01); E21B 17/028 (2013.01);
(Continued)

(58) Field of Classification Search
CPC . G01V 3/26; G01V 3/38; G01V 13/00; E21B 47/0905; E21B 17/028; E21B 7/04; E21B 41/0085; E21B 47/024; E21B 49/00
See application file for complete search history.

(56) References Cited

U.S. PATENT DOCUMENTS 6,257,334 B1  7/2001  Cyr et al.
6,966,211 B2  11/2005  Wu
(Continued)

FOREIGN PATENT DOCUMENTS

CA  2693917 A1  1/2009

OTHER PUBLICATIONS

International Search Report and Written Opinion for PCT/US2014/061763 dated Jun. 30, 2015.
(Continued)

Primary Examiner — Yoshihisa Ishizuka
(74) Attorney, Agent, or Firm — Jason Sedano; C. Tumey Law Group PLLC

(57) ABSTRACT

An example method of calibrating a downhole tool includes stimulating a known current through a power circuit provided in the downhole tool, the power circuit extending between and communicably coupling a power source and a load. A conductor magnetic field is generated as the known current flows through the power circuit and the conductor magnetic field is detectable by a magnetic sensor included in the downhole tool to obtain sample measurements of Earth's magnetic field. A magnitude of the conductor magnetic field is then measured to obtain a measured value for the conductor magnetic field, and a relationship between the known current and the measured value is determined to calculate a correction factor for the sample measurements based on the relationship. A computer in the downhole tool is then programmed to apply the correction factor to the sample (Continued)

measurements in response to operational currents measured in the power circuit during operation.

21 Claims, 2 Drawing Sheets

(51) Int. Cl.
    *G01V 3/38*     (2006.01)
    *E21B 47/09*     (2012.01)
    *E21B 17/02*     (2006.01)
    *E21B 7/04*     (2006.01)
    *E21B 41/00*     (2006.01)
    *E21B 47/024*     (2006.01)
    *E21B 49/00*     (2006.01)

(52) U.S. Cl.
    CPC ........ *E21B 41/0085* (2013.01); *E21B 47/024* (2013.01); *E21B 47/0905* (2013.01); *E21B 49/00* (2013.01); *G01V 3/26* (2013.01); *G01V 3/38* (2013.01)

(56) References Cited

U.S. PATENT DOCUMENTS

| | | | |
|---|---|---|---|
| 8,239,153 B2 | 8/2012 | Piemonte et al. | |
| 8,528,381 B2 | 9/2013 | Rodney et al. | |
| 8,531,180 B2 | 9/2013 | Piemonte et al. | |
| 2003/0121657 A1 | 7/2003 | Chia et al. | |
| 2006/0066454 A1* | 3/2006 | Kuckes | G01V 3/08 340/854.1 |
| 2006/0232138 A1* | 10/2006 | Williams | G01V 3/26 307/113 |
| 2006/0254768 A1* | 11/2006 | De Jesus | E21B 47/0905 166/255.1 |
| 2007/0203651 A1* | 8/2007 | Blanz | E21B 47/022 702/6 |
| 2007/0205770 A1* | 9/2007 | Fanini | G01V 3/28 324/339 |
| 2007/0278008 A1* | 12/2007 | Kuckes | E21B 47/02216 175/40 |
| 2008/0066331 A1 | 3/2008 | Brzezinski et al. | |
| 2008/0264624 A1* | 10/2008 | Hall | G01V 3/26 166/66.5 |
| 2009/0030615 A1 | 1/2009 | Clark | |
| 2010/0271232 A1 | 10/2010 | Clark et al. | |
| 2011/0129357 A1* | 6/2011 | Jennings | E21B 21/001 417/50 |
| 2011/0196612 A1* | 8/2011 | Bonavides | G01V 11/005 702/6 |
| 2012/0139748 A1 | 6/2012 | Hay et al. | |
| 2013/0341092 A1* | 12/2013 | Hay | E21B 7/04 175/24 |
| 2015/0337650 A1* | 11/2015 | Balogh | E21B 47/122 340/854.4 |
| 2016/0041293 A1* | 2/2016 | Boudah | G01V 3/26 702/7 |

OTHER PUBLICATIONS

Canadian Office Action from Canadian Patent Application No. 2962364, dated May 8, 2018, 7 pages.

* cited by examiner

MAGNETIC SENSOR CORRECTION FOR FIELD GENERATED FROM NEARBY CURRENT

BACKGROUND

In the oil and gas industry, magnetic azimuth measurements referenced to the Earth's magnetic field in downhole tools require extremely sensitive magnetic sensors, such as magnetometers. These measurements often need to be as accurate to a few nanotesla to obtain accurate measurements and thereby allow a well operator to ascertain the correct well direction of an associated downhole tool. However, there are many sources of error for measurements obtained from magnetic sensors, and it is critical to minimize each of them in order to maximize the accuracy of the measured azimuth.

In some cases, for instance, time dependent sources may cause error in magnetic sensor measurements. Time dependent sources for error include drift in scale and bias of the magnetic sensor and electronics due to thermal aging and mechanical shock. Another time dependent source for error is change in the magnetization of nearby magnetically permeable materials as well as magnetic fields generated by current flowing in conductors that run adjacent or nearby the magnetic sensor.

There are many reasons why current must flow past sensitive magnetic sensors in downhole tools. For example, power sources such as batteries or generators and electrical loads (e.g., electronics, sensors, actuators) can be positioned in a variety of locations along a tool string or in a downhole tool. This necessitates that signals and power be transmitted through and within individual downhole tools. Current provided by the power sources sometimes runs adjacent to the magnetic sensors, which are susceptible to magnetic interference caused by these currents.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure is related to downhole tools and, more particularly, to magnetic sensors used downhole and correcting magnetic sensor operation from magnetic fields generated by nearby electrical current flowing in conductors.

The embodiments described herein allow for high accuracy magnetic measurements to be made despite nearby currents that produce magnetic fields. The effects of the currents flowing within conductors may be quantified and a correction factor may be applied to adjacent magnetic sensors to negate the effects of any magnetic fields generated by flowing current. More particularly, the current in the conductors may be measured synchronously with measurements obtained by the magnetic sensors so that a relationship between the additive magnetic fields may be characterized to determine an offset. The calculated offset or correction factor may then be applied to the magnetic sensor measurements and thereby effectively null the magnetic field generated by the conductors and otherwise allow the magnetic sensors to provide corrected and more accurate measurements of the Earth's magnetic field. The corrections may be done in real-time while passively monitoring the current in the conductors, and the corrected measurements may be equivalent as if the magnetic field generated from the flowing current was not present. As will be appreciated, this may prove advantageous in allowing for accurate wellbore placement without an interruption to drilling operations such that static magnetic surveys may be undertaken.

Figure 1:
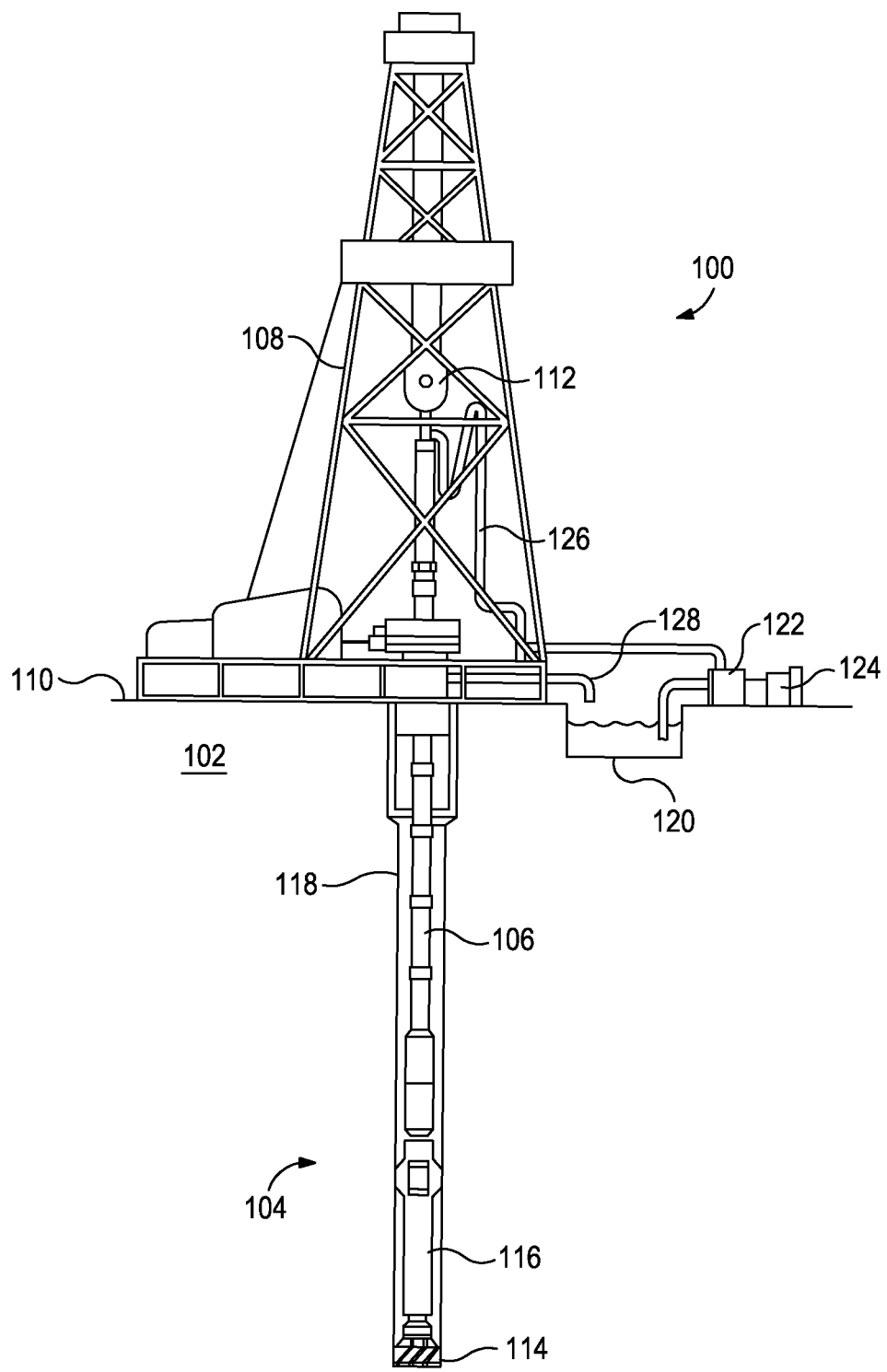
FIG. 1 is a schematic diagram of an exemplary drilling system that may employ one or more principles of the present disclosure.

Referring to FIG. 1, illustrated is an exemplary drilling system 100 that may employ one or more principles of the present disclosure. Boreholes may be created by drilling into the earth 102 using the drilling system 100. The drilling system 100 may be configured to drive a bottom hole assembly (BHA) 104 positioned or otherwise arranged at the bottom of a drill string 106 extended into the earth 102 from a derrick 108 arranged at the surface 110. The derrick 108 includes a kelly 112 used to lower and raise the drill string 106.

The BHA 104 may include a drill bit 114 operatively coupled to a tool string 116 which may be moved axially within a drilled wellbore 118 as attached to the drill string 106. During operation, the drill bit 114 penetrates the earth 102 and thereby creates the wellbore 118. The BHA 104 can include, for example, a directional drilling tool that provides directional control of the drill bit 114 as it advances into the earth 102. The tool string 116 can be semi-permanently mounted with various measurement tools (not shown) such as, but not limited to, measurement-while-drilling (MWD) and logging-while-drilling (LWD) tools, that may be configured to take downhole measurements of drilling conditions. The tool string 116 may also include one or more magnetic sensors, such as magnetometers, to obtain magnetic azimuth measurements referenced to the Earth's magnetic field.

Fluid or "mud" from a mud tank 120 may be pumped downhole using a mud pump 122 powered by an adjacent power source, such as a prime mover or motor 124. The mud may be pumped from the mud tank 120, through a stand pipe 126, which feeds the mud into the drill string 106 and conveys the same to the drill bit 114. The mud exits one or more nozzles arranged in the drill bit 114 and in the process cools the drill bit 114. After exiting the drill bit 114, the mud circulates back to the surface 110 via the annulus defined between the wellbore 118 and the drill string 106, and in the process returns drill cuttings and debris to the surface. The cuttings and mud mixture are passed through a flow line 128 and are processed such that a cleaned mud is returned downhole through the stand pipe 126 once again.

Although FIG. 1 depicts operation of the drilling system 100 in accordance with the present disclosure, those skilled in the art will readily appreciate that the principles of the present disclosure are equally applicable to other downhole operations, such as wireline operations where a downhole tool is extended into the wellbore 118 from the surface 110 on a wireline, slickline, or other similar type of wellbore conveyance to undertake one or more wellbore operations.

The various downhole tools of the BHA 104, such as the directional drilling tool, the MWD tool, the LWD tool, and other electronics, sensors, and actuators associated there-with, may be powered either locally or remotely using one or more power sources, such as batteries or generators. As will be appreciated, this often requires signals and power in the form of a current to be transmitted through various conductors to the individual tools and sensors associated with the BHA 104. As the current flows through the conductors, a magnetic field may be generated and interfere with the proper operation of the magnetic sensors included in the BHA 104. Such interference may alter the true readings of the Earth's magnetic field.

According to embodiments of the present disclosure, the effects of the current flowing within adjacent conductors may be quantified and a correction factor may be applied to the magnetic sensors to negate the effects of any magnetic fields generated by flowing current. More particularly, the current in the conductors may be measured synchronously with measurements obtained by the magnetic sensors so that a relationship between the additive magnetic fields may be characterized to determine an offset. The calculated offset or correction factor may then be applied to the magnetic sensor measurements and thereby effectively null the magnetic field generated by the conductors and otherwise allow the magnetic sensors to provide corrected and more accurate measurements of the Earth's magnetic field. As will be appreciated, the corrected measurements may be equivalent as if the magnetic field generated from the flowing current was not present.

Figure 2:
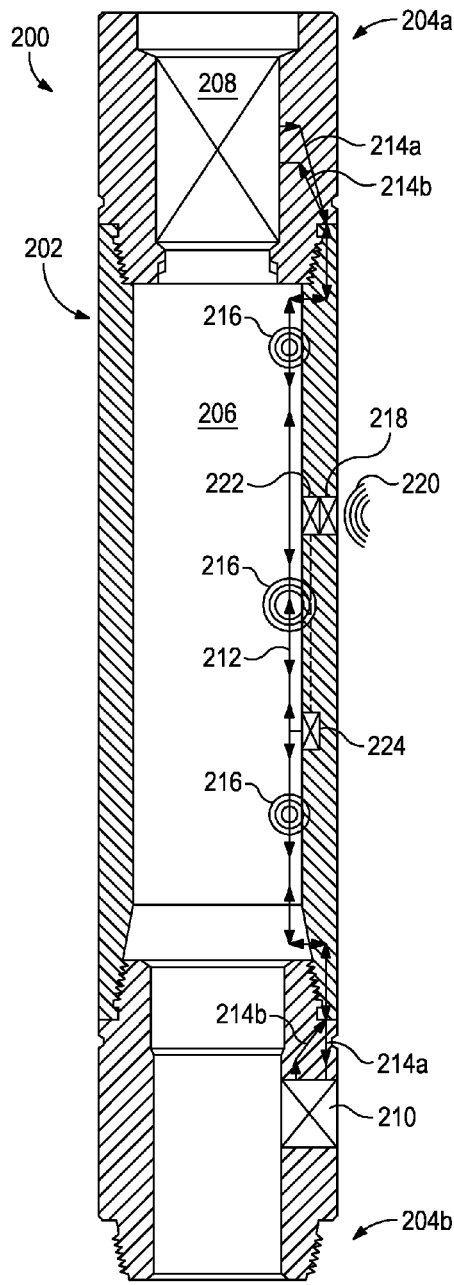
FIG. 2 is a cross-sectional side view of an exemplary downhole tool that may employ the principles of the present disclosure.

Referring now to FIG. 2, illustrated is a cross-sectional side view of an exemplary downhole tool 200 that may employ the principles of the present disclosure, according to one or more embodiments. In some embodiments, the downhole tool 200 may be used in the tool string 116 of FIG. 1 and, more particularly, may form part of the BHA 104 (FIG. 1). The downhole tool 200 may include or otherwise comprise a variety of downhole tools used in the exploration and extraction of hydrocarbons. For instance, the downhole tool 200 may be, but is not limited to, a directional drilling tool, an MWD tool, an LWD tool, one or more wireline tools, and any combination thereof.

As illustrated, the downhole tool 200 may include an elongate body 202 having a first or uphole end 204*a* and a second or downhole end 204*b*. The body 202 may be a generally cylindrical structure that defines an interior 206. In some embodiments, the body 202 may be a monolithic, cylindrical structure that extends uninterrupted between the first and second ends 204*a,b*. In other embodiments, however, the body 202 may be made up of two or more coupled subs or components, as illustrated. The body 202 may be configured to be positioned in the tool string 116 (FIG. 1) at any desired location, such as at or near the drill bit 114 (FIG. 1). Accordingly, the body 202 may be coupled to and otherwise interpose opposing lengths or portions of the tool string 116 at the first and second ends 204*a,b*, such as by threaded engagements or the like.

The downhole tool 200 may include a power source 208 and one or more loads 210 communicably and otherwise electrically coupled to the power source 208 via a power circuit 212. The power source 208 may be any device or mechanism configured to provide power or current to the load 210 for operation of the load 210. For example, the power source 208 may include, but is not limited to, one or more batteries, a generator (e.g., a flow-based turbine generator, a generator powered by drill string rotation, etc.), a fuel cell, a capacitive bank, or any combination thereof. The power source 208 may be positioned on the body 202 at a variety of locations, often depending on the type of power source 208 being used. In the illustrated embodiment, for instance, the power source 208 is depicted as being positioned in the interior 206 of the body 202. In such embodiments, the power source 208 may comprise a flow-based turbine generator that is able to receive a fluid flow from uphole portions of the drill string 106 (FIG. 1) to generate electrical power. In other embodiments, the power source 208 may alternatively be arranged within the wall of the body, without departing from the scope of the disclosure.

The load 210 may be any electricity-consuming device or mechanism that may be used in the exploration and extraction of hydrocarbons. For instance, the load 210 may include, but is not limited to, a sensor, a motor, an actuator, a downhole electronic device (e.g., a computer, a signal processor, etc.), a telemetry module, and any combination thereof.

The power circuit 212 may extend between the power source 208 and the load 210 and may generally be used to conduct current provided by the power source 208 to and from the load 210. As illustrated, the power circuit 212 may include one or more conductors 214, shown as a positive conductor 214*a* and a negative conductor 214*b*. The positive and negative conductors 214*a,b* may be unidirectional or bidirectional conductors, without departing from the scope of the disclosure. In some embodiments, the positive conductor 214*a* may be configured to carry current (e.g., electrical power, a signal, etc.) from the power source 208 to the load 210, and the negative conductor 214*b* may comprise a return path from the load 210 back to the power source 208 to complete the power circuit 212. As current is conducted through the power circuit 212, a conductor magnetic field 216 may be generated in the positive and negative conductors 214*a,b* and may propagate away or radially outward from the power circuit 212.

In some embodiments, one or both of the positive and negative conductors 214*a,b* may comprise current-conducting wires that extend between the power source 208 and the load 210. In such embodiments, one or both of the positive and negative conductors 214*a,b* may comprise self-shielding structures, such as a coaxial cable, a twisted pair of wires, or a bus bar, that minimize the conductor magnetic field 216 produced when current flows through. In at least one embodiment, however, the body 202 may be used as the negative conductor 214*b*. In such embodiments, the load 210 may be communicably and/or electrically coupled to the body 202, which may be made of an electrically-conductive material and used as the return path from the load 210 to the power source 208.

As illustrated, the downhole tool 200 may also include a magnetic sensor 218 positioned on the body 202. The magnetic sensor 218 may be, for example, a magnetometer (i.e., a fluxgate or MEMS-based magnetometer) used to detect and otherwise measure the Earth's magnetic field 220 to determine azimuth readings for the downhole tool 200. In other embodiments, however, the magnetic sensor 218 may be any type of sensor or device that may be able to sense and otherwise detect a magnetic field. The magnetic sensor 218 may be a tri-axial magnetometer having three orthogonal sensor components configured to measure magnetic fields in the X, Y, and Z directions, respectively, and thereby quantify or measure a single magnetic vector in three-dimensional space. The magnetic sensor 218 may be generally positioned on the body 202 such that the conductor magnetic field 216 generated by the power circuit 212 may be sensed by or otherwise affect operation of the magnetic sensor 218. In some embodiments, as illustrated, the magnetic sensor 218 may be positioned on the body 202 such that it axially interposes the location of the power source 208 and the load 210. In such embodiments, the power circuit 212 may generally traverse and otherwise bypass the location of the magnetic sensor 218. In other embodiments, however, the magnetic sensor 218 may be positioned at any location in the body 202 where the conductor magnetic field 216 generated by the power circuit 212 may nonetheless be detectable by or affect operation of the magnetic sensor 218.

The magnetic sensor 218 may be designed or otherwise capable of sensing the Earth's magnetic field 220 plus the additive conductor magnetic field 216 produced by the current in the power circuit 212 without risking saturation. The conductor magnetic field 216 generated by the power circuit 212 may magnetically interfere with operation of the magnetic sensor 218 to accurately monitor and measure the Earth's magnetic field 220 and may otherwise corrupt the Earth's magnetic field 220 in the vicinity of the magnetic sensor 218. According to the present disclosure, to remedy corruption of the Earth's magnetic field 220 caused by the conductor magnetic field 216, the magnetic sensor 218 may be calibrated to obtain a correction factor intended to negate the effects of the conductor magnetic field 216. Once calibrated, the correction factor may be applied to the magnetic sensor 218 during downhole operation to offset sample measurements obtained in view of the conductor magnetic field 216 generated by varying intensities of current flowing through the power circuit 212.

Figure 3:
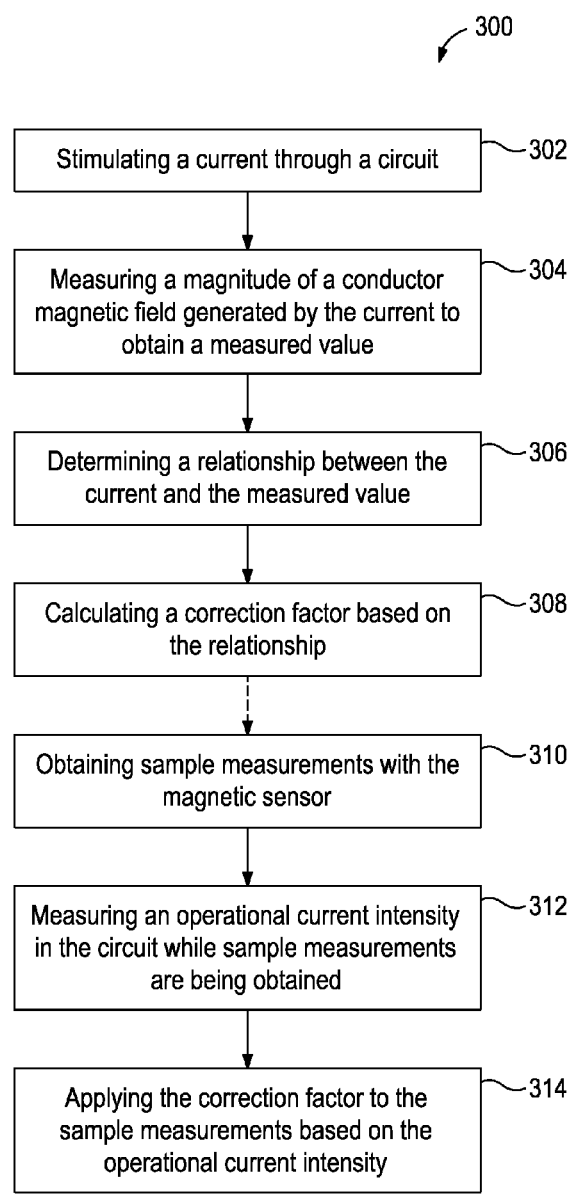
FIG. 3 is a schematic flowchart of a method of calibrating and using a magnetic sensor.

Referring now to FIG. 3, with continued reference to FIG. 2, illustrated is a schematic flowchart of a method 300 of calibrating and using the magnetic sensor 218, according to one or more embodiments. While the magnetic sensor 218 is described in the method 300 as being calibrated for use in the downhole tool 200 of FIG. 2, it will be appreciated that the magnetic sensor 218 may equally be calibrated for use in any type of downhole tool, without departing from the scope of the disclosure. As provided by the method 300, a current may be stimulated through the power circuit 212 between the power source 208 and the load 210, as at 302. In some embodiments, the current may be a known current expected to be used during normal operation of the downhole tool 200. For instance, the known current may be a current that is required to be consumed by the load 210 for proper operation. In other embodiments, however, the current stimulated through the power circuit 212 may be measured and otherwise monitored using a current sensor 224 (FIG. 2) communicably and otherwise electrically coupled to the power circuit 212. In yet other embodiments, the current may alternatively be monitored and otherwise measured at the power source 208 or the load 210 (or both) with suitable current measuring electronics, without departing from the scope of the disclosure.

As illustrated, the current sensor 224 may be positioned on the downhole tool 200, for example. The current sensor 224 may be configured to measure the current in the power circuit 212 and quantify the linear offset effect that the current has on the current sensor 224. In some cases, the current will form from the source 208 through a single positive conductor 214a to the load 210 and return via a single negative conductor 214b. In such cases, the current is the same in each conductor 214a,b and need only be measured once with the current sensor 224. In other cases, however, the downhole tool 200 may include one positive conductor 214a and two or more negative conductors 214b. In such cases, the current in the positive conductor 214a need only be measured, otherwise the combined current in both the negative conductors 214b may be measured. In any case, the net current flowing in the power circuit 212 may be obtained.

As the current flows through the power circuit 212, the power circuit 212 may emit or produce a discrete and distinct conductor magnetic field that may be detected and measured. The conductor magnetic field may be similar to the conductor magnetic field 216 described above, but may be dissimilar in magnitude if generated by a current of differing intensity. According to the method 300, the magnitude of the conductor magnetic field may be measured to obtain a corresponding measured value for the conductor magnetic field, as at 304. In some embodiments, the conductor magnetic field may be detected and measured by the magnetic sensor 218. As a tri-axial magnetometer, the magnetic sensor 218 may be able to measure and otherwise quantify the conductor magnetic field in three discrete measurements for each of the X, Y, and Z axes, and thereby provide a single magnetic vector in three-dimensional space. Accordingly, while the conductor magnetic field may only impact or affect one or two of the measurements, the magnetic sensor 218 may be able to provide a set of three calibration factors. In other embodiments, however, the conductor magnetic field may be detected and measured by a magnetic field detector (not shown) that does not form part of the downhole tool 200, but is instead used on-site during the calibration process.

The method 300 may further include determining a relationship between the current applied to the power circuit 212 and the measured value of the conductor magnetic field generated by the current, as at 306. The relationship may be determined by comparing the intensity of the measured current with the corresponding magnitude of the resulting generated conductor magnetic field as measured by the magnetic sensor 218. This relationship will typically be linear where the intensity of the current is proportional to the magnitude of its resulting generated conductor magnetic field.

With the relationship between the current and their corresponding conductor magnetic fields determined, a correction factor for the downhole tool 200 may be calculated, as at 308. The correction factor may be stored in memory and may be additive or subtractive, depending on how the generated magnetic fields are observed to affect the operation of the magnetic sensor 218. Once the correction factor is properly calculated and stored, the correction factor may be accessed and applied to the magnetic sensor 218 in response to any operational currents in the power circuit 212 measured during operation. More particularly, in some embodiments, the magnetic sensor 218 may include a computer 222 (FIG. 2) having a processor and a computer-readable storage medium that may include computer-readable instructions that, when executed by the processor, apply the correction factor to sample measurements of the Earth's magnetic field 220 in view of any currents measured in the power circuit 212. As will be appreciated, the computer 222 does not necessarily have to be an integral part of the magnetic sensor 218, but may alternatively form a component part of the downhole tool 200 but may nonetheless be in communication with the magnetic sensor 218. In yet other embodiments, the computer 222 may be arranged at a surface location and the signals necessary to calibrate the magnetic sensor 218 may be transmitted uphole to the surface location for processing.

With the correction factor programmed into the operation of the magnetic sensor 218, the downhole tool 200 may be considered calibrated and otherwise ready for use in a downhole operation. Accordingly, the preceding steps 302-308 of the method 300 may be generally characterized as calibration steps for the downhole tool 200 and/or the magnetic sensor 218, and the following steps 310-314 of the method 300 may be generally characterized as operational steps for using the calibrated downhole tool 200.

The calibrated downhole tool 200 may be introduced downhole and the magnetic sensor 218 may be activated to commence obtaining sample measurements of the Earth's magnetic field 220, as at 310. While the magnetic sensor 218 is obtaining sample measurements, the load 210 may be operating and, therefore, an operational current may be flowing through the power circuit 212. As used herein, the term "operational current" refers to a current used to power and the load 210 for downhole use. The operational current may exhibit any current intensity required to properly power and operate the load 210. As the operational current flows in the power circuit 212, an operational conductor magnetic field may be generated based on an intensity of the operational current. The operational conductor magnetic field may be similar to the conductor magnetic field 216 described above, but may be dissimilar in magnitude if generated by an operational current of differing intensity. Simultaneously or otherwise synchronously with the operation of the magnetic sensor 218, the intensity of the operational current in the power circuit 212 may be measured and reported, as at 312. In some embodiments, the operational current in the power circuit 212 may be monitored using the current sensor 224 (FIG. 2). The operational current may alternatively be monitored and otherwise measured at the power source 208 or the load 210 (or both) with suitable current measuring electronics, without departing from the scope of the disclosure. In any event, the operational current intensity may be transmitted to the computer 222 for processing.

The computer 222 may be configured to receive and process the operational current intensity and apply the correction factor to the sample measurements obtained by the magnetic sensor 218 based on the measured operational current intensity, as at 314. By applying the correction factor, the sample measurements obtained by the magnetic sensor 218 will be offset such that the effects of the operational conductor magnetic field generated by the operational current flowing through the power circuit 212 may be substantially or entirely negated. As a result, the magnetic sensor 218 may be able to provide and report corrected and more accurate measurements of the Earth's magnetic field 220.

It will be appreciated that the foregoing description of the calibration of the magnetic sensor 218 may equally be undertaken downhole instead of at a surface location. Moreover, in the event that any physical or position changes occur to the positive and negative conductors 214a,b while operating downhole, the downhole tool 200 may be able to undertake a dynamic calibration process while downhole. It may also prove advantageous to undertake a dynamic calibration of the downhole tool 200 when other factors or operational parameters (e.g., downhole temperatures) alter the validity of the correction factor. Downhole dynamic calibrations may be undertaken by stimulating known current values in the power circuit 212 and comparing those stimulated current values to static calibrated sample measurements (i.e., samples with no current) obtained by the magnetic sensor 218. For instance, while the downhole tool 200 is not rotating or advancing within the wellbore 118 (FIG. 1), the Earth's magnetic field 220 as measured by the magnetic sensor 218 will be constant. While the downhole tool 200 is stationary, known current values may be stimulated into the power circuit 212 to generate corresponding conductor magnetic fields 216, and the effect of the generated conductor magnetic fields 216 on the magnetic sensor 218 may be calculated to determine a new correction factor. When operation of the downhole tool 200 commences once again, the new correction factor may be applied to the sample measurements obtained by the magnetic sensor 218.

Based on the relationship previously determined on how the magnetic sensor 218 reacts to the known currents applied to the power circuit 212, the correction factor may be applicable to practically any current intensity that may be experienced during operation of the downhole tool 200. In some embodiments, for instance, the correction factor determined during the calibration process may comprise a generic relationship that may be applied to multiple downhole tools. For instance, the correction factor may be determined and otherwise established for a representative downhole tool, such as the downhole tool 200 of FIG. 2, and thereafter applied to a plurality of other downhole tools that may have a similar physical arrangement of the power circuit 212 relative to the magnetic sensor 218. As will be appreciated, this may be advantageous in instances where the geometry and the generated magnetic fields are sufficiently repeatable from downhole tool to downhole tool and within a certain tolerance. In other embodiments, however, a correction factor may be determined and otherwise calculated for each downhole tool used in a downhole operation. As will be appreciated, such embodiments may increase the complexity of the calibration process, but may also result in improvements to the correction accuracy.

During both the calibration process and downhole operation, the power circuit 212 (i.e., the positive and negative conductors 214a,b) and the magnetic sensor 218 may each be constrained within the body 202 such that they are unable to move relative to one another and thereby cause deviations in the measured conductor magnetic fields 216. More particularly, if the positive and negative conductors 214a,b had the freedom to move or change position with movement or vibration during operation of the downhole tool 200, the nature of the conductor magnetic field 216 emitted by the power circuit 212 may change, thereby potentially invalidating the calibration process. In some embodiments, one or both of the positive and negative conductors 214a,b may be secured to the body 202 such that movement of the positive and negative conductors 214a,b with respect to the body 202 and, more particularly, the magnetic sensor 218 is prevented or substantially prevented. As illustrated, the positive and negative conductors 214a,b may be secured within the interior 206 of the body 202. In such embodiments, the positive and negative conductors 214a,b may be coupled to the body 202 using an epoxy, industrial tape, clamps, mechanical fasteners, any combination thereof, and the like. In other embodiments, the positive and negative conductors 214a,b may be positioned within the wall of the body 202, such as within one or more rifle-drilled holes that extend along all or a portion of the body 202. As will be appreciated, any changes to the physical dimensions of the positive and negative conductors 214a,b through deformation may also reduce the effectiveness of the correction factor. Accordingly, it may prove advantageous to secure the positive and negative conductors 214a,b to the body 202 where they will not be deformed, warped, or distorted during operation.

The methods described herein may be combined with other existing methods that seek to reduce or cancel out generated magnetic fields through self-shielding of the positive and negative conductors 214a,b. Examples of self-shielding of magnetic fields generated by the positive and negative conductors 214a,b include implementing twisted pair, strip lines, or coaxial structures with bus bars for the positive and negative conductors 214a,b. As will be appreciated, the lower the magnitude of the generated conductor magnetic field 216, the more effective the presently described methods will be in further improving the measurement of the Earth's magnetic field 220.

Moreover, other methods that may be used in conjunction with the presently described methods to reduce or cancel out generated magnetic fields include orienting the positive and negative conductors 214a,b as far as possible from the magnetic sensor 218. More particularly, the downhole tool 200 and other downhole tools are, by nature, long, slender, hollow cylinders. This means that the placement of the positive and negative conductors 214a,b and the magnetic sensor 218 is usually constrained in the body 202. In some situations, particular placement of the positive and negative conductors 214a,b may result in the generated conductor magnetic field 216 being orders of magnitude larger than the few nanoteslas required to measure an accurate azimuth using the magnetic sensor 218. To reduce the generated conductor magnetic field 216, the positive and negative conductors 214a,b may be oriented or otherwise placed within the body 202 as far as possible from the magnetic sensor 218 since magnetic fields generally decay with distance. In embodiments where the body 202 is cylindrical, orienting the positive and negative conductors 214a,b as far as possible from the magnetic sensor 218 may include angularly offsetting the positive and negative conductors 214a,b about the circumference of the body 202 at a maximum angular distance.

In some embodiments, instead of orienting the positive and negative conductors 214a,b as far as possible from the magnetic sensor 218, or in addition thereto, the positive and negative conductors 214a,b may be oriented in a manner that emits the lowest magnetic field at a given distance. This may prove advantageous since the conductor magnetic fields are not always symmetrical for all radial angles.

Those skilled in the art will readily appreciate that the methods described herein, or large portions thereof, may be automated at some point such that a computerized system may be programmed to calibrate and auto-calibrate downhole tools. Hardware for the computer 222 (FIG. 2) that may be used to implement the various methods and algorithms described herein can include a processor configured to execute one or more sequences of instructions, programming stances, or code stored on a non-transitory, computer-readable medium. The processor can be, for example, a general purpose microprocessor, a microcontroller, a digital signal processor, an application specific integrated circuit, a field programmable gate array, a programmable logic device, a controller, a state machine, a gated logic, discrete hardware components, an artificial neural network, or any like suitable entity that can perform calculations or other manipulations of data. In some embodiments, computer hardware can further include elements such as, for example, a memory (e.g., random access memory (RAM), flash memory, read only memory (ROM), programmable read only memory (PROM), electrically erasable programmable read only memory (EEPROM)), registers, hard disks, removable disks, CD-ROMS, DVDs, or any other like suitable storage device or medium.

Executable sequences described herein can be implemented with one or more sequences of code contained in a memory. In some embodiments, such code can be read into the memory from another machine-readable medium. Execution of the sequences of instructions contained in the memory can cause a processor to perform the process steps described herein. One or more processors in a multi-processing arrangement can also be employed to execute instruction sequences in the memory. In addition, hard-wired circuitry can be used in place of or in combination with software instructions to implement various embodiments described herein. Thus, the present embodiments are not limited to any specific combination of hardware and/or software.

As used herein, a machine-readable medium will refer to any medium that directly or indirectly provides instructions to a processor for execution. A machine-readable medium can take on many forms including, for example, non-volatile media, volatile media, and transmission media. Non-volatile media can include, for example, optical and magnetic disks. Volatile media can include, for example, dynamic memory. Transmission media can include, for example, coaxial cables, wire, fiber optics, and wires that form a bus. Common forms of machine-readable media can include, for example, floppy disks, flexible disks, hard disks, magnetic tapes, other like magnetic media, CD-ROMs, DVDs, other like optical media, punch cards, paper tapes and like physical media with patterned holes, RAM, ROM, PROM, EPROM and flash EPROM.

Embodiments disclosed herein include:

A. A downhole tool that includes a body, a power source coupled to the body, a load coupled to the body, a power circuit extending between and electrically coupling the power source and the load to conduct current provided by the power source to and from the load, wherein, when current flows through the power circuit, a conductor magnetic field is generated, a magnetic sensor coupled to the body to obtain sample measurements of Earth's magnetic field, wherein the magnetic sensor is positioned on the body such that the conductor magnetic field affects operation of the magnetic sensor, a current sensor communicably coupled to the power circuit to measure the current in the power circuit, and a computer communicably coupled to the magnetic sensor and the current sensor for receiving current measurements from the current sensor and applying a correction factor to the sample measurements based on the current measurements to negate effects of the magnetic field on the sample measurements.

B. A method of calibrating a downhole tool that includes stimulating a current through a power circuit provided in the downhole tool, the power circuit extending between and electrically coupling a power source and a load, wherein the power source and the load are each coupled to a body of the downhole tool, generating a conductor magnetic field as the current flows through the power circuit, wherein the conductor magnetic field being is detectable by a magnetic sensor coupled to the body and the magnetic sensor is used to obtain sample measurements of Earth's magnetic field, measuring a magnitude of the conductor magnetic field to obtain a measured value for the conductor magnetic field, determining a relationship between the current and the measured value, and calculating a correction factor for the sample measurements based on the relationship.

C. A method that includes introducing a downhole tool into a wellbore, the downhole tool having a body, a power source coupled to the body, and a load coupled to the body, flowing an operational current through a power circuit to operate the load, a power circuit extending between and electrically coupling the power source and the load, whereby an operational conductor magnetic field is generated based on an intensity of the operational current, obtaining sample measurements of the Earth's magnetic field with a magnetic sensor coupled to the body, wherein the magnetic sensor is positioned on the body such that the operational conductor magnetic field affects operation of the magnetic sensor, measuring the intensity of the operational current with a current sensor communicably coupled to the power circuit while the magnetic sensor obtains the sample measurements, receiving a signal indicative of the intensity of the operational current with a computer communicably coupled to the magnetic sensor and the current sensor, and applying with the computer a correction factor to the sample measurements based on the intensity of the operational current, and thereby negating effects of the operational conductor magnetic field on the sample measurements.

Each of embodiments A, B, and C may have one or more of the following additional elements in any combination: Element 1: wherein the downhole tool comprises a tool selected from the group consisting of a directional drilling tool, a measure-while-drilling tool, a logging-while-drilling tool, one or more wireline tools, and any combination thereof. Element 2: wherein the power source is selected from the group consisting of one or more batteries, a generator, a fuel cell, a capacitive bank, or any combination thereof. Element 3: wherein the load comprises an electricity-consuming device selected from the group consisting of a sensor, a motor, an actuator, a downhole electronic device, a telemetry module, and any combination thereof. Element 4: wherein the power circuit comprises a positive conductor and a negative conductor. Element 5: wherein one or both of the positive and negative conductors comprise a self-shielding structure selected from the group consisting of a coaxial cable, a twisted pair of wires, a bus bar, and a strip line. Element 6: wherein the positive and negative conductors are fixed relative to the magnetic sensor. Element 7: wherein the body is cylindrical and the positive and negative conductors are angularly offset from the magnetic sensor about a circumference of the body at a maximum angular distance.

Element 8: wherein stimulating the current through the power circuit comprises stimulating a known current through the power circuit. Element 9: wherein stimulating the current through the power circuit further comprises measuring an intensity of the current with a current sensor. Element 10: wherein determining the relationship comprises comparing an intensity of the current with the magnitude of the conductor magnetic field. Element 11: wherein measuring the magnitude of the conductor magnetic field comprises measuring the magnitude of the conductor magnetic field with the magnetic sensor. Element 12: further comprising introducing the downhole tool into a wellbore and flowing an operational current through the power circuit to operate the load, whereby an operational conductor magnetic field is generated based on an operational current intensity, obtaining the sample measurements of the Earth's magnetic field with the magnetic sensor, measuring the operational current intensity with a current sensor communicably coupled to the power circuit while the magnetic sensor obtains the sample measurements, and receiving a signal indicative of the operational current intensity with the a computer associated with the downhole tool and applying the correction factor to the sample measurements with the computer based on the operational current intensity, and thereby negating effects of the operational conductor magnetic field on the sample measurements. Element 13: further comprising dynamically calibrating the downhole tool while the downhole tool is located within the wellbore. Element 14: wherein dynamically calibrating the downhole tool comprises stimulating a known current in the power circuit while the downhole tool is located in the wellbore and thereby generating an additional conductor magnetic field, measuring an intensity of the known current with the current sensor, comparing a measured value of the intensity of the known current to a static sample measurement obtained by the magnetic sensor, determining a new relationship between the known current and the measured value of the intensity of the known current, and calculating a new correction factor for the sample measurements based on the new relationship. Element 15: wherein the power circuit comprises a positive conductor and a negative conductor, the method further comprising self-shielding one or both of the positive conductor and a negative conductors to provide a self-shielding structure, wherein the self-shielding structure is selected from the group consisting of a coaxial cable, a twisted pair of wires, a bus bar, and a strip line. Element 16: wherein the power circuit comprises a positive conductor and a negative conductor, the method further comprising coupling the positive and negative conductors to the body such that movement of the positive and negative conductors relative to the magnetic sensor is prevented. Element 17: further comprising applying the new correction factor to the sample measurements in response to operational currents measured in the power circuit during operation.

Element 18: wherein the correction factor is determined prior to introducing the downhole tool into the wellbore by stimulating at least one known current through the power circuit, generating a conductor magnetic field as the at least one known current flows through the power circuit, wherein the conductor magnetic field is detectable by the magnetic sensor, measuring a magnitude of the conductor magnetic field to obtain a measured value for the conductor magnetic field, determining a relationship between the at least one known current and the measured value and calculating the correction factor based on the relationship, and programming the computer to apply the correction factor to the sample measurements in response to operational currents measured in the power circuit during operation of the downhole tool. Element 19: wherein the power circuit comprises a positive conductor and a negative conductor, the method further comprising coupling the positive and negative conductors to the body such that movement of the positive and negative conductors relative to the magnetic sensor is prevented.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The use of directional terms such as above, below, upper, lower, upward, downward, left, right, uphole, downhole and the like are used in relation to the illustrative embodiments as they are depicted in the figures, the upward direction being toward the top of the corresponding figure and the downward direction being toward the bottom of the corresponding figure, the uphole direction being toward the surface of the well and the downhole direction being toward the toe of the well.

What is claimed is:

1. A downhole tool, comprising:
   a body;
   a power source coupled to the body;
   a load coupled to the body;
   a power circuit extending between and electrically coupling the power source and the load to conduct current provided by the power source to and from the load, wherein, when current flows through the power circuit, a conductor magnetic field is generated;
   a magnetic sensor coupled to the body to obtain sample measurements of a magnetic field, wherein the magnetic sensor is positioned on the body separately from the power circuit, the power source and the load, such that the conductor magnetic field affects operation of the magnetic sensor;
   a current sensor communicably coupled to the power circuit to measure the current in the power circuit; and
   a computer communicably coupled to the magnetic sensor and the current sensor, the computer configured to:
      receive the sample measurements of the magnetic field from the magnetic sensor during drilling operations using a drill string that includes the downhole tool,
      receive current measurements from the current sensor during the drilling operations,
      obtain a stored correction factor during the drilling operations,
      determine, based on the stored correction factor and the received current measurements, a portion of the conductor magnetic field that is induced at the magnetic sensor by the conducted current during the drilling operations,
      remove the determined portion of the conductor magnetic field from the sample measurements of the magnetic field to obtain a measurement of Earth's magnetic field during the drilling operations, and
      provide the measurement of Earth's magnetic field for control of a directional drilling tool during the drilling operations.

2. The downhole tool of claim 1, wherein the downhole tool comprises a tool selected from the group consisting of the directional drilling tool, a measure-while-drilling tool, a logging-while-drilling tool, one or more wireline tools, and any combination thereof.

3. The downhole tool of claim 1, wherein the power source is selected from the group consisting of one or more batteries, a generator, a fuel cell, a capacitive bank, or any combination thereof.

4. The downhole tool of claim 1, wherein the load comprises an electricity-consuming device selected from the group consisting of a sensor, a motor, an actuator, a downhole electronic device, a telemetry module, and any combination thereof.

5. The downhole tool of claim 1, wherein the power circuit comprises a positive conductor that conducts a supply current from the power source to the load and a negative conductor that conducts a return current from the load.

6. The downhole tool of claim 5, wherein one or both of the positive and negative conductors comprise a self-shielding structure selected from the group consisting of a coaxial cable, a twisted pair of wires, a bus bar, and a strip line.

7. The downhole tool of claim 5, wherein the positive and negative conductors are fixed relative to the magnetic sensor.

8. The downhole tool of claim 5, wherein the body is cylindrical and the positive and negative conductors are angularly offset by 180 degrees from the magnetic sensor about a circumference of the body.

9. A method of calibrating a downhole tool for use in directional drilling operations with a drill string incorporating the downhole tool, comprising:
   stimulating a current through a power circuit provided in the downhole tool, the power circuit extending between and electrically coupling a power source and a load, wherein the power source and the load are each coupled to a body of the downhole tool,
   wherein the current generates a conductor magnetic field at a magnetic sensor coupled to the body separately from the power source and the load and configured to obtain sample measurements;
   measuring a magnitude of the conductor magnetic field to obtain a measured value for the conductor magnetic field;
   determining a relationship between the current and the measured value;
   calculating a correction factor for the sample measurements based on the relationship; and
   storing the correction factor in the downhole tool for downhole use in obtaining, with the magnetic sensor, a measurement of Earth's magnetic field for control of a directional drilling tool in the directional drilling operations.

10. The method of claim 9, wherein stimulating the current through the power circuit comprises stimulating a known current through the power circuit.

11. The method of claim 9, wherein stimulating the current through the power circuit further comprises measuring an intensity of the current with a current sensor.

12. The method of claim 9, wherein determining the relationship comprises comparing an intensity of the current with the magnitude of the conductor magnetic field.

13. The method of claim 9, wherein measuring the magnitude of the conductor magnetic field comprises measuring the magnitude of the conductor magnetic field with the magnetic sensor.

14. The method of claim 9, further comprising, during the directional drilling operations:
   introducing the downhole tool into a wellbore and flowing an operational current through the power circuit to operate the load, whereby an operational conductor magnetic field is generated based on an operational current intensity;
   obtaining sample measurements of a magnetic field with the magnetic sensor;
   measuring the operational current intensity with a current sensor communicably coupled to the power circuit during a time period in which the magnetic sensor obtains the sample measurements;
   receiving a signal indicative of the operational current intensity with a computer associated with the downhole tool and applying the correction factor to the sample measurements with the computer based on the operational current intensity, and thereby removing the operational conductor magnetic field from the sample measurements to obtain the measurement of the Earth's magnetic field; and
   dynamically calibrating the downhole tool while the downhole tool is located within the wellbore.

15. The method of claim 14, wherein dynamically calibrating the downhole tool comprises:
   stimulating a known current in the power circuit while the downhole tool is located in the wellbore;
   measuring an intensity of the known current with the current sensor;
   comparing a measured value of the intensity of the known current to a static sample measurement obtained by the magnetic sensor;
   determining a new relationship between the known current and the measured value of the intensity of the known current; and
   calculating a new correction factor for the sample measurements based on the new relationship.

16. The method of claim 15, further comprising applying the new correction factor to the sample measurements in response to operational currents measured in the power circuit during operation.

17. The method of claim 9, wherein the power circuit comprises a positive conductor that conducts a supply current from the power source to the load and a negative conductor that conducts a return current from the load, the method further comprising self-shielding one or both of the positive conductor and the negative conductor to provide a self-shielding structure, wherein the self-shielding structure is selected from the group consisting of a coaxial cable, a twisted pair of wires, a bus bar, and a strip line.

18. The method of claim 9, wherein the power circuit comprises a positive conductor that conducts a supply current from the power source to the load and a negative conductor that conducts a return current from the load, the method further comprising coupling the positive and negative conductors to the body such that movement of the positive and negative conductors relative to the magnetic sensor is prevented.

19. A method, comprising:
   introducing a downhole tool into a wellbore during drilling operations with a drill string incorporating the downhole tool, the downhole tool having a body, a power source coupled to the body, and a load coupled to the body;
   flowing an operational current through a power circuit to operate the load, the power circuit extending between and electrically coupling the power source and the load, whereby an operational conductor magnetic field is generated based on an intensity of the operational current during the drilling operations;
   obtaining sample measurements of a magnetic field, during the drilling operations, with a magnetic sensor coupled to the body, wherein the magnetic sensor is positioned on the body separately from the power circuit, the power source, and the load such that the operational conductor magnetic field affects operation of the magnetic sensor;
   measuring, during the drilling operations, the intensity of the operational current with a current sensor communicably coupled to the power circuit during a time period in which the magnetic sensor obtains the sample measurements;
   receiving, during the drilling operations, a signal indicative of the intensity of the operational current with computing equipment in the downhole tool and communicably coupled to the magnetic sensor and the current sensor;
   receiving, with the computing equipment during the drilling operations, the sample measurements;
   obtaining, with the computing equipment during the drilling operations, a correction factor stored by the downhole tool;
   determining, with the computing equipment during the drilling operations and based on the correction factor and the signal indicative of the intensity of the operational current, a portion of the operational conductor magnetic field that is induced at the magnetic sensor by the operational current;
   removing, during the drilling operations, the portion of the operational conductor magnetic field from the sample measurements to obtain a measurement of the Earth's magnetic field with the computing equipment; and
   providing the measurement of the Earth's magnetic field for control of a directional drilling tool during the drilling operations.

20. The method of claim 19, wherein the correction factor is determined prior to introducing the downhole tool into the wellbore by:
   stimulating at least one known current through the power circuit;
   generating a conductor magnetic field as the at least one known current flows through the power circuit, wherein the conductor magnetic field is detectable by the magnetic sensor;
   measuring a magnitude of the conductor magnetic field to obtain a measured value for the conductor magnetic field;
   determining a relationship between the at least one known current and the measured value; and
   calculating the correction factor based on the relationship; and
   storing the correction factor in the downhole tool.

21. The method of claim 19, wherein the power circuit comprises a positive conductor that conducts current from the power source to the load and a negative conductor that conducts a return current from the load, the method further comprising coupling the positive and negative conductors to the body such that movement of the positive and negative conductors relative to the magnetic sensor is prevented.

* * * * *